US011488049B2

(12) United States Patent
Cao et al.

(10) Patent No.: US 11,488,049 B2
(45) Date of Patent: Nov. 1, 2022

(54) HYBRID QUANTUM-CLASSICAL COMPUTER SYSTEM AND METHOD FOR OPTIMIZATION

(71) Applicant: Zapata Computing, Inc., Boston, MA (US)

(72) Inventors: Yudong Cao, Cambridge, MA (US); Andrei Kniazev, Cambridge, MA (US)

(73) Assignee: Zapata Computing, Inc., Boston, MA (US)

( * ) Notice: Subject to any disclaimer, the term of this patent is extended or adjusted under 35 U.S.C. 154(b) by 353 days.

(21) Appl. No.: 16/844,051

(22) Filed: Apr. 9, 2020

(65) Prior Publication Data

US 2020/0327441 A1 Oct. 15, 2020

Related U.S. Application Data

(60) Provisional application No. 62/831,492, filed on Apr. 9, 2019.

(51) Int. Cl.
*G06N 10/00* (2022.01)

(52) U.S. Cl.
CPC .................... *G06N 10/00* (2019.01)

(58) Field of Classification Search
CPC ...................................................... G06N 10/00
See application file for complete search history.

(56) References Cited

U.S. PATENT DOCUMENTS

| 7,590,607 | B2 | 9/2009 | Williams et al. |
|---|---|---|---|
| 7,877,333 | B2 | 1/2011 | Macready |
| 8,700,689 | B2 | 4/2014 | Macready et al. |
| 8,832,164 | B2 | 9/2014 | Allen et al. |
| 8,832,165 | B2 | 9/2014 | Allen et al. |
| 8,897,449 | B1 | 11/2014 | Broadbent |
| 9,064,067 | B2 | 6/2015 | Wecker |
| 9,218,567 | B2 | 12/2015 | Macready et al. |
| 9,477,796 | B2 | 10/2016 | Garcia-Ramirez et al. |
| 9,836,432 | B2 | 12/2017 | Ronagh |
| 10,242,321 | B2 | 3/2019 | Bocharov et al. |
| 10,275,717 | B2 | 4/2019 | Babbush et al. |
| 10,572,816 | B1 | 2/2020 | Vavilov et al. |
| 10,666,462 | B2 | 5/2020 | Shin et al. |
| 10,776,709 | B2 | 9/2020 | Shen et al. |

(Continued)

FOREIGN PATENT DOCUMENTS

| CN | 106611377 A | 5/2017 |
|---|---|---|
| CN | 112789629 A | 5/2021 |

(Continued)

OTHER PUBLICATIONS

Aaronson, S., "Quantum Machine Learning Algorithms: Read the Fine Print", Nature Physics, vol. 11, pp. 1-5 (2015).

(Continued)

*Primary Examiner* — Kurtis R Bahr
(74) *Attorney, Agent, or Firm* — Blueshift IP, LLC; Robert Plotkin

(57) ABSTRACT

A hybrid quantum-classical computing method for solving optimization problems though applications of non-unitary transformations. An initial state is prepared, a transformation is applied, and the state is updated to provide an improved answer. This update procedure is iterated until convergence to an approximately optimal solution.

8 Claims, 12 Drawing Sheets

(56) References Cited

U.S. PATENT DOCUMENTS

| | | | |
|---|---|---|---|
| 10,846,366 | B1 | 11/2020 | Otterbach et al. |
| 10,990,677 | B2 | 4/2021 | Wiebe et al. |
| 11,010,682 | B2 | 5/2021 | Bocharov et al. |
| 11,244,240 | B2* | 2/2022 | Martinis ............... G06N 10/00 |
| 2005/0167658 | A1 | 8/2005 | Williams et al. |
| 2014/0297247 | A1* | 10/2014 | Troyer .................... G06F 30/20 |
| | | | 703/21 |
| 2017/0147303 | A1 | 5/2017 | Amy et al. |
| 2017/0255872 | A1 | 9/2017 | Hamze et al. |
| 2017/0364796 | A1 | 12/2017 | Wiebe et al. |
| 2018/0197102 | A1 | 7/2018 | Mohseni et al. |
| 2019/0164059 | A1* | 5/2019 | Denchev ............... G06N 3/126 |
| 2019/0164079 | A1 | 5/2019 | Gambetta et al. |
| 2019/0244680 | A1 | 8/2019 | Rolfe et al. |
| 2019/0318053 | A1 | 10/2019 | Low et al. |
| 2019/0394030 | A1 | 12/2019 | Forbes et al. |
| 2020/0057957 | A1* | 2/2020 | Johnson ................ G06N 10/40 |
| 2020/0104740 | A1 | 4/2020 | Cao |
| 2020/0118025 | A1 | 4/2020 | Romero et al. |
| 2020/0184278 | A1 | 6/2020 | Zadeh et al. |
| 2020/0202249 | A1 | 6/2020 | Hastings |
| 2020/0226197 | A1* | 7/2020 | Woerner ............... G06N 10/00 |
| 2020/0257987 | A1* | 8/2020 | McGeoch .............. G06N 5/003 |
| 2020/0293936 | A1 | 9/2020 | Granade et al. |
| 2020/0320159 | A1 | 10/2020 | Matthews |
| 2020/0327440 | A1 | 10/2020 | Cao |
| 2020/0334107 | A1 | 10/2020 | Katabarwa |
| 2020/0349459 | A1 | 11/2020 | Cao et al. |
| 2020/0394547 | A1 | 12/2020 | Cao et al. |
| 2021/0011748 | A1 | 1/2021 | Lee et al. |
| 2021/0133618 | A1 | 5/2021 | Cao |
| 2021/0255856 | A1 | 8/2021 | Cao |

FOREIGN PATENT DOCUMENTS

| | | |
|---|---|---|
| EP | 3113084 A1 | 1/2017 |
| EP | 3837647 A1 | 6/2021 |
| WO | 2017066695 A1 | 4/2017 |
| WO | 2017152289 A1 | 9/2017 |
| WO | 2017156318 A1 | 9/2017 |
| WO | 2017189052 A1 | 11/2017 |
| WO | 2018064535 A1 | 4/2018 |
| WO | 2020037301 A1 | 2/2020 |
| WO | 2020072661 A1 | 4/2020 |
| WO | 2020142122 A2 | 7/2020 |
| WO | 2021092351 A1 | 5/2021 |

OTHER PUBLICATIONS

Abrams, D. S., and Lloyd, S., et al., "A quantum algorithm providing exponential speed increase for finding eigenvalues and eigenvectors", arXiv:quant-ph/9807070v1, vol. 83, No. 24, pp. 1-9 (Jul. 24, 1998).

Airbus., "Airbus Quantum Computing Challenge: Bringing flight physics into the Quantum Era", <<https://www.airbus.com/innovation/industry-4-0/quantum-technologies/airbus-quantum-computing-challenge.html>>, pp. 1-3 (Dec. 17, 2018).

Ambainis, A., "On physical problems that are slightly more difficult than QMA," In 2014 IEEE 29th Conference on Computational Complexity (CCC), pp. 1-12 (2014).

Anschuetz, E., et al., "Variational Quantum Factoring," arXiv:1808.08927v1. Aug. 27, 2018 [retrieved on Nov. 25, 2019]. Retrieved from <https://arxiv.org/pdf/1808.08927.pdf>.

Anschuetz, E., et al., "Variational Quantum Factoring," Feb. 19, 2019, Advances in Databases and Information Systems; [Lecture Notes in Computer Science; Lect.Notes Computer], Springer International Publishing, Cham, pp.74-85, XP047505564, ISBN: 978-3-319-10403-4.

Aspuru-Guzik, A., et al., "Simulated Quantum Computation of Molecular Energies", Science, Quantum Physics, vol. 309, No. 5741, pp. 1-21 (Sep. 9, 2005).

Atia, Y., and Aharonov, D., "Fast-Forwarding of Hamiltonians and Exponentially Precise Measurements," Nature communications. vol. 8, No. 1, pp. 1-9 (Nov. 17, 2017).

Berry, D. W. et al., "Simulating Hamiltonian Dynamics with a Truncated Taylor Series", Phys. Rev. Lett. 114, 090502 pp. 1-5, Mar. 3, 2015.

Berry, D. W., "High-order quantum algorithm for solving linear differential equations", Journal of Physics A Mathematical and Theoretical, arXiv:1010.2745v2, vol. 47, No. 10, pp. 1-14 (Jan. 28, 2014).

Berry, D. W., et al., "Quantum algorithm for linear differential equations with exponentially improved dependence on precision", arXiv:1701.03684v2, pp. 1-20 (Feb. 17, 2017).

Brassard, G., et al., "Quantum Amplitude Amplification and Estimation", arXiv:quant-ph/0005055v1, pp. 1-22 (May 15, 2000).

Bravo-Prieto, C., et al., "Variational Quantum Linear Solver," Quantum Physics, arXiv:1909.05820, pp. 1-21 (Sep. 12, 2019).

Bravyi, L. D., et al., "Fermionic Quantum Computation", Annals of Physics, vol. 298, No. 1, pp. 210-226 (2002).

Buhrman, H. et al., "Quantum fingerprinting", Physical Review Letters, vol. 87, Issue No. 16, pp. 1-8, Sep. 2001.

Burges, C. J. C., "Factoring as Optimization," Microsoft Research, Microsoft Corporation, Tech. Rep. MSR-TR-2002-83, 19 pages (2002).

Cao, "Hybrid quantum-classical algorithm for variational coupled cluster method", APS March Meeting 2019, vol. 64, No. 2, Monday-Friday, March pp. 4-8, 2019; Boston, Massachusetts.

Cao, Y., et al., "Potential of Quantum Computing for Drug Discovery," IBM Journal of Research and Development, vol. 62, Issue 6, p. 6:1-6:20, (Dec. 2018).

Cao, Y., et al., "Quantum algorithm and circuit design solving the Poisson equation," New Journal of Physics, vol. 15, pp. 1-29 (Jan. 2013).

Cao, Y., et al., "Quantum Chemistry in the Age of Quantum Computing", Quantum Physics, arXiv:1812.09976v2, pp. 1-194 (Dec. 28, 2018).

Chakraborty, S., et al., "The Power of Blockencoded Matrix Powers: Improved Regression Techniques Via Faster Hamiltonian Simulation," arXiv preprint arXiv:1804.01973, pp. 1-58 (Sep. 3, 2018).

Chamorro-Posada, P., and Garcia-Escartin, J.C., "The SWITCH test for discriminating quantum evolutions", Quantum Physics, pp. 1-5 (2017).

Childs, A. M. et al., "Hamiltonian simulation using linear combinations of unitary operations", Quantum Information and Computation, vol. 12, pp. 901-924 (2012).

Childs, A. M., et al., "Quantum algorithm for systems of linear equations with exponentially improved dependence on precision", SIAM Journal on Computing vol. 46, Issue No. 6, pp. 1-31, Jan. 2017.

Childs, A. M., et al., "Quantum algorithm for systems of linear equations with exponentially improved dependence on precision", arXiv: 1511.02306v2, pp. 1-31 (2017).

Clader, B. D., et al., "Preconditioned quantum linear system algorithm", Phys. Rev. Lett., arXiv:1301.2340v4, vol. 110, No. 25, pp. 1-5 (May 7, 2013).

Dantsin, E., et al., "A deterministic (2-2/(k +1))n algorithm for k-SAT based on local search," Theoretical Computer Science 289, pp. 69-83 (2002).

Dash, A., et al., "Exact Search Algorithm to Factorize Large Biprimes and a Triprime on IBM Quantum Computer", pp. 1-13 (Jul. 2018).

Dattani, N.S., and Bryans, N., "Quantum factorization of 56153 with only 4 qubits," arXiv:1411.6758, pp. 1-6 (Nov. 27, 2014).

Dridi, R., and Alghassi, H., "Prime Factorization Using Quantum Annealing and Computational Algebraic Geometry," Nature Scientific Reports 7, Article No. 43048 (2017), 17 pages, arXiv:1604.05796.

Dunjko, V., et al., "Computational Speedups Using Small Quantum Devices," (Jul. 25, 2018), pp. 1-18 pages, arXiv:1807.08970.

Evangelista, F. A., "Alternative single-reference coupled cluster approaches for multireference problems: The simpler, the better", Journal of Chemical Physics, vol. 134(22), pp. 1-13, 2011.

(56) References Cited

OTHER PUBLICATIONS

Extended European Search Report dated Apr. 25, 2022, in European patent application No. 19850464.9, 11 pages.
Farhi, E., et al., "A quantum approximate optimization algorithm", Quantum Physics, arXiv:1411.4028v1, pp. 1-16 (Nov. 14, 2014).
Final Office Action dated Apr. 13, 2021, in U.S. Appl. No. 16/543,478 of Yudong Cao, filed Aug. 16, 2019, 25 pages.
Ge, Y., et al., "Faster Ground State Preparation and High-Precision Ground Energy Estimation with Fewer Qubits," Journal of Mathematical Physics, vol. 60, No. 2,: arXiv:1712.03193, 1-25 (Feb. 2, 2018).
Gharibian, S., et al., "Oracle Complexity Classes and Local Measurements on Physical Hamiltonians," In 37th International Symposium on Theoretical Aspects of Computer Science (STAGS 2020). Schloss Dagstuhl-Leibniz-Zentrum für Informatik, 2020. arXiv:1909.05981, pp. 1-38 (Sep. 12, 2019).
Gharibian, S., et al., "The complexity of simulating local measurements on quantum systems," Quantum, 3:189, 2019. arXiv:1606.05626, pp. 1-38 (Apr. 7, 2020).
Gilyeé, A., et al., "Quantum Singular Value Transformation and Beyond: Exponential Improvements for Quantum Matrix Arithmetics," In Proceedings of the 51st Annual ACM SIGACT Symposium on Theory of Computing, pp. 193-204, 2019. arXiv:1806.01838, Jun. 5, 2018, 67 pages.
Gingrich, R. M., and Williams, C. P., "Non-unitary probabilistic quantum computing", ACM, pp. 1-6 (Sep. 15, 2003).
Gómez-Bombarelli, R., et al., "Automatic Chemical Design Using a Data-Driven Continuous Representation of Molecules", ACS Cent. Sci., vol. 4, No. 2, pp. 268-276 (2018).
Gonthier, J., et al., "Identifying challenges towards practical quantum advantage through resource estimation: the measurement roadblock in the variational quantum eigensolver," Quantum Physics, arXiv:2012.04001, pp. 1-27 (Dec. 7, 2020).
Grover, L. K., "Fixed-point quantum search", Physical Review Letters, Issue No. 95, vol. 15, pp. 1-13, Oct. 2005.
Grover, L.K., "A fast quantum mechanical algorithm for database search", STOC '96: Proceedings of the twenty-eighth annual ACM symposium on Theory of Computing, pp. 1-8 (Jul. 1996).
Guerreschi, G. G., "Repeat-Until-Success circuits with fixed-point oblivious amplitude amplification", Phys. Rev. A 99, 022306 pp. 1-13, Aug. 10, 2018.
Harrow, A. W., et al., "Quantum algorithm for linear systems of equations", Phys. Rev. Lett., vol. 103, No. 15, 1-15 (2009).
Harsha, G. et al., "On the difference between variational and unitary coupled cluster theories", J. Chem. Phys. vol. 148, 044107, pp. 1-6, (2018).
Helgaker T. et al., "Molecular Electronic-Structure Theory", Book published by John Wiley & Sons, pp. 1-908 (2000).
Hinton, G. E., and Salakhutdinov, R.R., "Reducing the Dimensionality of Data with Neural Networks," Science, vol. 313, Issue. 5786, pp. 504-508 (Jul. 28, 2006) Available online at https://www.cs.toronto.edu/~hinton/science.pdf.
Huang, H., et al., "Near-term quantum algorithms for linear systems of equations," arXiv preprint arXiv:1909.07344, pp. 1-22 (Dec. 16, 2019).
McClean, J. R., et al., "The theory of variational hybrid quantum-classical algorithms", New Journal of Physics, vol. 18, pp. 1-22 (Feb. 5, 2016).
McClean, J. R., et al., "Barren plateaus in quantum neural network training landscapes", Nature Communications, vol. 9, pp. 1-6 (2018).
International Search Report & Written Opinion dated Feb. 26, 2021, in international patent application No. PCT/US2020/059371, 8 pages.
International Search Report & Written Opinion dated Jul. 30, 2020, in international patent application No. PCT/US2019/054795, 8 pages.
International Search Report and Written Opinion dated Dec. 4, 2019 in PCT Application No. PCT/US2019/046966, 8 pages.
International Search Report and Written Opinion dated Jan. 29, 2020, in International Patent Application No. PCT/US2019/054316, 8 pages.
Kandala, A., et al., "Hardware-efficient Variational Quantum Eigensolver for Small Molecules and Quantum Magnets," Nature 549, arXiv:1704.05018v2, pp. 1-24 (2017).
Kothari, R., "Efficient algorithms in quantum query complexity", PhD thesis, University of Waterloo, pp. 1-128, 2014.
Lin, L, and Tong, Y., "Near-optimal ground state preparation," Quantum, 4:372,arXiv:2002.12508, pp. 1-22 (Dec. 6, 2020).
Matlab "Global Optimization Toolbox," The MathWorks, Inc., Copyright 1994-2021. 12 pages. Accessible at https://www.mathworks.com/products/global-optimization.html.
McArdle, S., et al., "Digital quantum simulation of molecular vibrations," Chemical science, 10(22):5725-5735, 2019. arXiv:1811.04069, pp. 1-14 (Jan. 23, 2020).
McClean, J.R., et al., "The theory of variational hybrid quantum-classical algorithms," New Journal of Physics, vol. 18, No. 2, arXiv:1509.04279, pp. 1-20 (Sep. 14, 2015).
Meir, Y., and Wingreen., "Landauer formula for the current through an interacting electron region," Physical review letters, vol. 68, No. 16, pp. 2512-2516, (Apr. 20, 1992).
Moll, N., et al., "Quantum optimization using variational algorithms on near-term quantum devices," Quantum Science and Technology, vol. 3, pp. 18 (Jun. 19, 2018) [retrieved on Nov. 25, 2019], Retrieved from <https://iopscience.iop.org/article/10.1088/2058-9565/aab822/pdf>.
Moll, N., et al., "Quantum optimization using variational algorithms on near-term quantum devices," Arxiv.org, Cornell University Library, 201 Olin Library Cornell University Ithaca, NY 14853, pp. 1-30 (Oct. 3, 2017), XP081147319, DOI: 10.1088/2058-9565/AAB822.
Moser, R.A., and Scheder, D., "A full derandomization of Schoning's k-SAT algorithm," Proceedings of the 43rd Annual ACM Symposium on Theory of Computing—STOC '11, pp. 245-251 (ACM Press, New York, New York, USA, 2011).
Nielsen, M. A., and Chuang, I. L., "Quantum Computation and Quantum Information", Cambridge University Press, pp. 1-704 (2000).
Nielsen, M., "The Fermionic canonical commutation relations and the Jordan-Wigner transform", michaelnielsen.org, pp. 1-8, 2005.
Non-Final Office Action dated Dec. 7, 2020, in U.S. Appl. No. 16/543,478 of Yudong Cao, filed Aug. 16, 2019, 33 pages.
Non-Final Office Action dated Sep. 3, 2021, in U.S. Appl. No. 16/543,478 of Yudong Cao, filed Aug. 16, 2019, 27 pages.
Notice of Allowance dated Jun. 9, 2021 for U.S. Appl. No. 17/272,189 of Yudong Cao, filed Feb. 26, 2021, 16 pages.
O'Malley, P. J. J., et al., "Scalable quantum simulation of molecular energies", Physical Review X, vol. 6, No. 3, pp. 031007-1-031007-13, (2016).
O'Brien, T. E., et al., "Calculating energy derivatives for quantum chemistry on a quantum computer," NPJ Quantum Information, vol. 5, No. 1, pp. 1-12 (2019).
Otterbach et al., U.S. Appl. No. 62/597,836 Specification, Provisional for U.S. Appl. No. 16/217,410, now U.S. Pat. No. 10,846,366, Dec. 2017. (Year: 2017).
Peruzzo, A., et al., "A variational eigenvalue solver on a photonic quantum processor", Nature Communications, vol. 5, Article No. 4213, pp. 1-7 (2014).
Preskill, J., "Quantum Computing in the NISQ era and beyond", Jul. 31, 2018, pp. 1-20.
Preskill, J., "Quantum Computing in the NISQ era and beyond", arXiv preprint arXiv:1801.00862v3, pp. 1-20 (Jul. 31, 2018).
Rebentrost, P., et al., "Quantum support vector machine for big data classification", Physical Review Letters, arXiv:1307.0471v3, vol. 113, No. 3, pp. 1-5 (Jul. 10, 2014).
Rice, J.E., et al., "Quantum computation of dominant products in lithium-sulfur batteries," The Journal of Chemical Physics, 154(13):134115, 2021. arxiv2001.01120, pp. 1-7 (Jan. 4, 2020).
Romero, J., et al., "Strategies for quantum computing molecular energies using the unitary coupled cluster ansatz", arXiv:1701.02691v2 [quant-ph], vol. 4, No. 4, pp. 1-18 (Feb. 10, 2018).

(56) References Cited

OTHER PUBLICATIONS

Schuch, N. and Verstraete, F., "Computational Complexity of interacting electrons and fundamental limitations of Density Functional Theory", Nature Physics, DOI: 10.1038/NPHYS1370, pp. 732-735 (Aug. 23, 2009).
Seeley, J.T., et al., "The Bravyi-Kitaev transformation for quantum computation of electronic structure," The Journal of chemical physics, 137(22):224109, 2012. arXiv:1208.5986, pp. 1-38 (Aug. 29, 2012).
Setia, K. et al., "Bravyi-Kitaev Superfast simulation of fermions on a quantum computer", arXiv:1712.00446v3 pp. 1-13, 2017.
Shen, Y., et al., "Quantum implementation of unitary coupled cluster for simulating molecular electronic structure", arXiv:1506.00443v2, vol. 95, No. 2, pp. 1-6 (2015).
Shor, P.W., "Polynomial-Time Algorithms for Prime Factorization and Discrete Logarithms on a Quantum Computer," SIAM Journal on Computing, vol. 26, Issue 5, 28 pages, (1997) 1484, arXiv:9508027.
Somma, R. D., "Quantum eigenvalue estimation via time series analysis," New Journal of Physics, 21(12):123025, 2019. arXiv:1907.11748, pp. 1-10 (Sep. 4, 2020).
Somma, R. D., et al., "Spectral gap amplification," SIAM Journal on Computing, 42(2):593-610, 2013. arXiv:1110.2494, Mar. 30, 2012, 14 pages.
Subasi, Y., et al., "Quantum algorithms for systems of linear equations inspired by adiabatic quantum computing," Physical review letters, vol. 122, No. 6, pp. 1-9 (Nov. 29, 2018).
Szabo, A. and Ostlund, N.S., "Modern quantum chemistry: introduction to advanced electronic structure theory," Courier Corporation, 2012. pp . 1-479 (2012).
Tensorflow, "TensorFlow Core: Tutorial," 39 pages, Last updated May 20, 2021 UTC. Accessible at https://www.tensorflow.org/tutorials/.
Terashima, H. et al., "Nonunitary quantum circuit", International Journal of Quantum Information, vol. 3, No. 4, pp. 1-19, Apr. 6, 2005.
Theodore J. Y. et al., "Fixed-point quantum search with an optimal number of queries", Physical Review Letters, Issue No. 113, vol. 21, pp. 210501-5, Nov. 2014.
Voorhis T. V. et al., "Benchmark variational coupled cluster doubles results", Journal of Chemical Physics, 113 (20):8873-8879, 2000.
Wang, G., et al., "Minimizing Estimation Runtime on Noisy Quantum Computers," PRX Quantum 2.1 pp. 010346-1-49 (2021).
Wang, Z., et al., "The Quantum Approximation Optimization Algorithm for MaxCut: A Fermionic View," Arxiv.org, Cornell University, 201 Olin Library Cornell University Ithaca, NY 14853, pp. 1-13 (Jun. 9, 2017), XP081277838, DOI: 10.1103/PHYSREVA.97.022304.
Watson, J.D., et al., "The complexity of translationally invariant problems beyond ground state energies", arXiv preprint arXiv:2012.12717, pp. 1-58 (Dec. 23, 2020).
Whitfield, J. D., et al., "Simulation of electronic structure Hamiltonians using quantum computers", Molecular Physics, arXiv:1001.3855v3, vol. 109, No. 5, pp. 1-22 (2011).
Wiebe, N., et al., "Quantum Data Fitting", Phys. Rev. Lett., arXiv:1204.5242v2, pp. 1-6 (Jul. 3, 2012).
Xu, N., et al., "Quantum Factorization of 143 on a Dipolar-Coupling Nuclear Magnetic Resonance System," Physical Review Letters, arXiv:1111.3726, vol. 108, No. 13, pp. 1-5 (Mar. 30, 2012).
Yamada, S. et al., "High Performance LOBPCG Method for Solving Multiple Eigenvalues of Hubbard Model: Efficiency of Communication Avoiding Neumann Expansion Preconditione", In: Yokota R., Wu W. (eds) Supercomputing Frontiers. SCFA 2018. Lecture Notes in Computer Science, vol. 10776. Springer, Cham, pp. 243-256.
Zujev, A., "Note on Non-Unitary Quantum Gates in Quantum Computing", Working Paper, University of California, Davis, DOI: 10.13140/RG.2.2.30712.85767, pp. 1-3, 2017.
International Search Report & Written Opinion dated Jun. 24, 2022, in international application No. PCT/US2022/021521, 8 pages.
Marsh, S., and Wang, J.B., "Combinatorial optimization via highly efficient quantum walks," Physical Review Research, vol. 2, No. 2 023302 (2020), pp. 1-8 (Jun. 8, 2020).
Non-Final Office Action dated Jun. 24, 2022, in U.S. Appl. No. 16/844,011 of Yudong Cao, filed Apr. 9, 2020, 46 pages.

\* cited by examiner

HYBRID QUANTUM-CLASSICAL COMPUTER SYSTEM AND METHOD FOR OPTIMIZATION

BACKGROUND

Quantum computers promise to solve industry-critical problems which are otherwise unsolvable or only very inefficiently addressable using classical computers. Key application areas include chemistry and materials, bioscience and bioinformatics, logistics, and finance. Interest in quantum computing has recently surged, in part due to a wave of advances in the performance of ready-to-use quantum computers.

Optimization problems, including solving systems of linear equations, eigenvalue problems, and constrained minimization of cost functions, are the key component of many science and engineering applications. Classical methods for numerical solution of optimization problems are well developed but suffer from the curse of dimensionality; that is, conventional systems typically perform sub-optimally when the problem size increases.

An emerging genre of algorithms in the space of quantum computing is hybrid quantum-classical algorithms, where a parametrized quantum circuit is used for solving a certain task using a quantum computer and where a classical computer is used for optimizing the quantum circuit parameters with respect to some objective function that is efficiently measurable on the quantum computer.

However, one potential challenge in implementing hybrid quantum-classical algorithms effectively concerns optimizing the quantum circuit. As the problem size of a task grows, the number of parameters that need to be optimized also grows, giving rise to high-dimensional black-box optimization problems that are difficult for a classical computer to solve. Such difficulty is rigorously manifested in a recent study (McClean et al., 2018) showing that the optimization landscape has vanishingly small gradient in most regions. To surmount the problem, one known potential solution (McClean et al., 2016) is to start from an educated initial guess of a good quantum circuit for the problem instead of a quantum circuit chosen in a random or ad hoc manner.

Quantum computers provide alternative means of solving the optimization problems by taking advantage of unique features of quantum mechanics that are not accessible by classical computers. One well-known method for solving eigenvalue problems on a quantum computer is phase estimation. Assuming that one can start with a quantum state encoding a reasonably good approximation of the eigenvector sought, phase estimation can generate a quantum state encoding the exact eigenstate sought as well as the corresponding eigenvalue up to certain error.

Another well-known technique for solving eigenvalue problems on quantum computers is the variational quantum eigensolver (VQE). As a hybrid quantum-classical algorithm, VQE prepares a quantum state with a quantum circuit with tunable parameters. The approximate ground state (lowest eigenvector) and ground state energy are obtained by tuning the parameters of the quantum circuit while measuring the energy of the state with respect to the Hamiltonian (the Hermitian matrix whose lowest eigenpair is sought).

However, both the phase estimation and VQE rely on unitary transformations of the initial quantum state to generate the desired output state. The unitary transformations can be implemented on a quantum computer. However, such methods relying on unitary operations are dependent on a good initial approximation to the true solution to the optimization problem—but good initial approximations are rarely known in most practical scenarios, limiting the use of techniques relying on unitary transformations.

Furthermore, in some conventional approaches, the initial approximation to the solution is subject to restrictive assumptions that the distance between the initial approximation and the exact solution of the optimization problem is sufficiently small, in order to enable fast convergence. One reason for possibly slow convergence is that the optimization method is restricted to unitary transformations on the quantum computer part of the hybrid quantum-classical computer, due to the nature of closed quantum system evolution. Such restrictions on the initial approximation being sufficiently close to the solution cannot be met in many practical applications, significantly limiting the use of quantum computing.

SUMMARY

A hybrid quantum-classical computing method for solving optimization problems though applications of non-unitary transformations. An initial state is prepared, a transformation is applied, and the state is updated to provide an improved answer. This update procedure is iterated until convergence to an approximately optimal solution.

BRIEF DESCRIPTION OF THE DRAWINGS

In what follows, embodiments of the invention are explained in more detail with reference to the drawings, in which.

DETAILED DESCRIPTION

Figure 1:
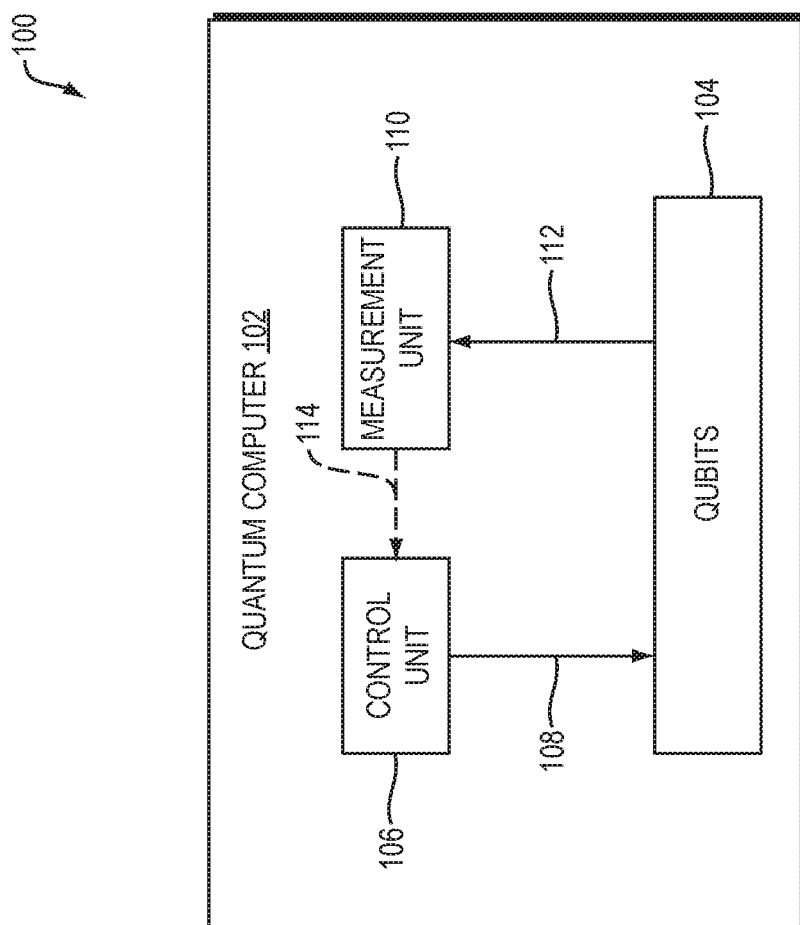
FIG. 1 is a diagram of a quantum computer according to one embodiment of the present invention.

In some embodiments, the methods and systems described herein provide a hybrid quantum-classical computer for solving an optimization problem stored in a memory of a classical computer by applying, on a quantum computer, a non-unitary transformation to an initial state to obtain an updated state, wherein the non-unitary transformation is determined by initial parameters stored on the memory of the classical computer, the optimization problem and the initial state, and wherein the updated state determines updated parameters using a processor of the classical computer, and wherein a description of an approximate solution to the optimization problem is determined by the updated state and the updated parameters. The initial parameters may be determined using one or a combination of randomly generated quantum states, retrieval from a database, and previously computed initial parameters, wherein the process is iteratively repeated. In one embodiment, the description of the solution is a list of numbers stored in the memory of the classical computer in a computer-readable form of one or a combination of single and double precision.

Since quantum computers are naturally suited for implementing unitary operations, to realize non-unitary operations, unconventional techniques involving either open quantum systems or measurement post-selections are needed but which are not trivial to design. In some embodiments, the invention overcomes the challenge of realizing non-unitary transformation by utilizing linear combination of unitary (LCU) techniques and oblivious amplitude amplification.

LCU is a probabilistic process that implements non-unitary transformations with a certain success probability. In order to boost the success probability, amplitude amplification is needed. Conventional amplitude amplification techniques rely on the ability to perform reflections with respect to the initial state, making the amplification process inefficient and technically challenging. In one embodiment, the technical challenge is addressed by using fixed-point oblivious amplitude amplification steps instead of the conventional amplitude amplification.

In some embodiments, the optimization problem is solved by minimizing a cost or maximizing a profit function. As is well-understood by those having ordinary skill in the art, a cost function seeks to minimize a function and a profit function seeks to maximize a function. As a result, the two are interchangeable with each other, since minimizing a cost function is equivalent to maximizing the negative of the cost function, and vice versa. Therefore, any reference herein to minimizing a cost function should be understood to have an equivalent expression in relation to a profit function (i.e., a profit function that maximizes the inverse of the cost function), and vice versa. The cost or profit function may be quadratic and minimization or maximization of the quadratic cost function may be determined by an iterative method, wherein an initial approximation to an exact solution of the optimization problem is iteratively improved, according to embodiments of the invention. The optimization problem may have multiple exact solutions, in which case the goal of the iterative method is to determine one of the exact solutions approximately. A distance is determined between two solutions characterizing how well they approximate each other. In another embodiment, a distance is determined between two descriptions of the two solutions.

In one embodiment of the invention, a unitary transformation is applied in the quantum computer where, restricted to a subset of an entire set of quantum states, some unitary transformation naturally become non-unitary (since, as those of ordinary skill in the art will understand, unitary transformations restricted to a subset of states can become non-unitary), wherein the restricted transformation is used for solving the optimization problem, in dramatic departure from the prior art. The benefit of using the restricted transformation, which is non-unitary, is that the prior art restrictions on the initial approximation being sufficiently close to the solution can be dropped without negatively affecting the convergence, thus allowing quantum computing to be efficient for a wide variety of applications.

In some embodiments, the initial state on the quantum computer part of the hybrid quantum-classical computer is an arbitrary quantum state. The initial state is updated, by using the transformation which is non-unitary when restricted to the subset, leading to the updated state. The subset is determined in some embodiments by a state of a subset of qubits in the quantum computer, wherein the subset of qubits is selected such that the quantum state of the subset of qubits represents the parameters for the non-unitary transformation.

The non-unitary transformation on the quantum computer is determined by the initial parameters and the optimization problem, which are stored in the memory of the classical computer and transmitted from the classical computer to a controller on the quantum computer. The controller then executes the non-unitary transformation on the initial state of the quantum computer.

The updated state is measured on the quantum computer, and the results of the measurements are transmitted to the processor on the classical computer for two purposes. The processor on the classical computer updates the parameters based on the measurements. The updated parameters are stored on the memory on the classical computer. In some embodiments, the updated parameters are transmitted back to the quantum computer to generate a new non-unitary transformation in an iterative fashion.

In various embodiments, the results of the measurements of the updated state on the quantum computer, together with the updated parameters, determine on the classical computer the description of the approximate solution to the optimization problem stored in the memory of the classical computer. In some embodiments, the updated parameters are one or a combination of scalars, vectors, matrices, and tensors that on the one hand require little memory to store on a classical computer. On the other hand, the set of all previously stored updated parameters determines the description of the operation that is used in some embodiments to generate on the quantum computer the updated state that approximates the exact solution of the optimization problem. Measurements of the updated state on the quantum computer then determine quantities related to the exact solution of the optimization problem such as the exact optimal value of the cost or the profit function.

In some embodiments, the description of the approximate solution stored in the memory of the classical computer determines an operator on the quantum computer. In one embodiment, the updated parameters are scalars and the operator on the quantum computer is a polynomial with coefficients determined by the updated parameters. The approximate solution of the optimization problem is determined by applying on the quantum computer the operator to the initial state. In some embodiments, it is advantageous that the operator is the polynomial because the application of the polynomial operator on a quantum computer can be efficiently implemented.

In some embodiments, the approximate solution of the optimization problem on the quantum computer is measured on the quantum computer to determine approximate optimal values of a cost function of the optimization problem. The measurement of the cost function on the quantum computer may be advantageous compared to alternative methods for evaluation of the cost function on a classical computer. The computational resources on the classical computer required for evaluating the cost function may not be realistic, for example the memory on the classical computer may not be sufficient to store the approximate solution. In other embodiments, the quantum measurements are performed on the quantum computer and the approximate optimal values of the cost function is determined from the quantum measurements on the processor of the classical computer. In one embodiment, the processor on the classical computer calculates statistics of the quantum measurements.

In some embodiments, the approximate solution to the optimization problem and the quantum state may be initially far away from the true solution and the true state. In one embodiment, the approximate solution to the optimization problem and the quantum state are improved with an iterative loop. The iterative loop begins by applying the quantum transformation to the initial state to produce the updated state on the quantum computer. The iterative loop then includes updating, by the processor of the classical computer, the parameters from the updated state using the quantum measurements on the quantum computer and the optimization problem stored in the memory of the classical computer, such that the updated state describes an improvement to the approximate solution to the optimization problem. Finally, the updated parameters are transmitted from the memory of the classical computer to the quantum computer to determine the non-unitary transformation. Then the loop repeats itself iteratively.

In a different embodiment, the iterative loop includes checking convergence criteria, wherein the repetitive execution of the iterative loop is terminated if the convergence criteria are met. In one embodiment, the convergence criteria are determined by one or a combination of iterative increments in the cost function or the profit function and the distance between two subsequent solutions in the iterative loop, describing how well they approximate each other.

Figure 4:
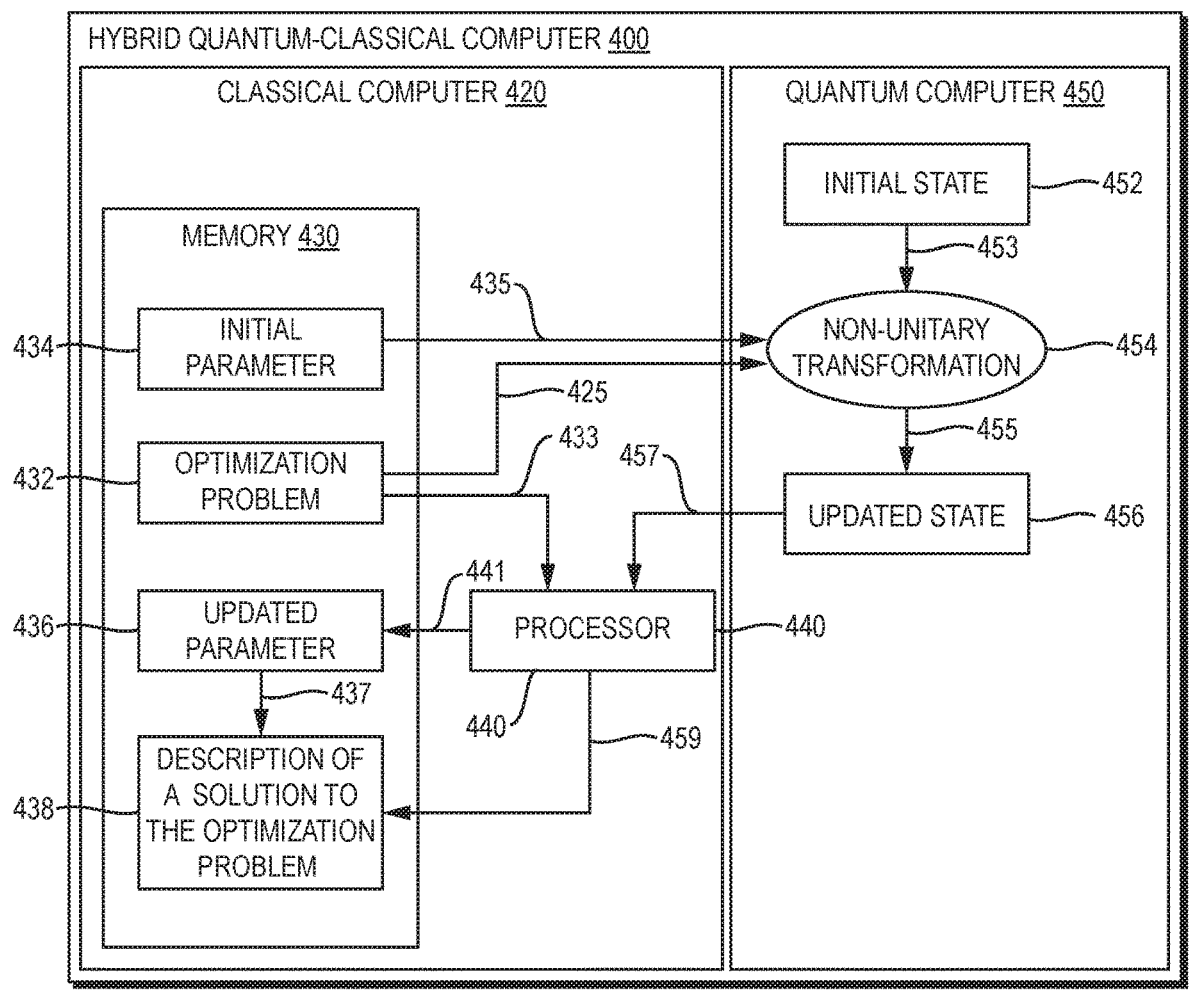
FIGS. 4, 5, 6, 7, 8a, and 8b are diagrams of hybrid quantum-classical computers for solving an optimization problem according to various embodiments of the present invention.

In some embodiments, and in connection with FIG. 4, the methods and systems described herein provide a hybrid quantum-classical computer 400 for solving an optimization problem 432 stored in a memory 430 of a classical computer 420 by applying 453, on a quantum computer 450, a non-unitary transformation 154 to an initial state 452 to obtain 455 an updated state 456, wherein the non-unitary transformation 454 is determined 435 by initial parameters 434 stored on the memory 430 of the classical computer 420, and also determined 425 by the optimization problem 432 and acts 453 on the initial state 452 to obtain 455 the updated state 456. The processor 440 of the classical computer 420 uses the updated state 456 to update 457/441 the parameters 436, and wherein a description 438 of an approximate solution to the optimization problem 432 is computed 437/459 by the processor 440 of the classical computer 420 using the updated state 456 and the updated parameters 436, as shown in FIG. 1.

Figure 5:
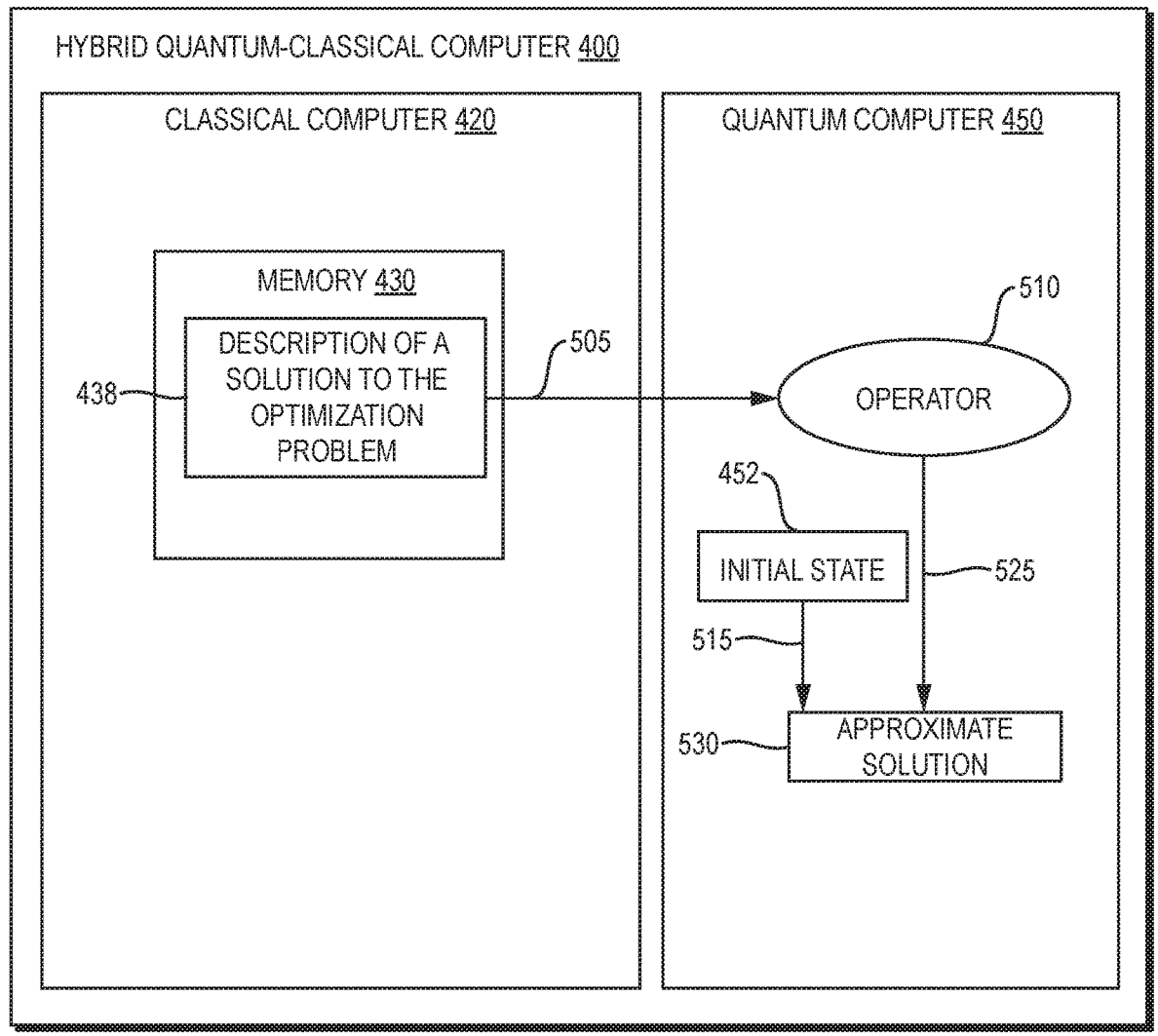

FIG. 5 illustrates an embodiment in which the description of the approximate solution 438 is stored in the memory 430 of the classical computer 420 and determines 505 the operator 510 on the quantum computer 450. In one embodiment, the updated parameters 436 are scalars and the operator 510 on the quantum computer 450 is a polynomial with coefficients determined by the updated parameters 436. The approximate solution 530 of the optimization problem 432 is determined at 515 and at 525 by applying, on the quantum computer 450, the operator 510 to the initial state 452. In some embodiments, it is advantageous that the operator 510 is the polynomial because the application of the polynomial operator 510 on a quantum computer 450 can be efficiently implemented, in contrast to prior arts wherein the application on the classical computer 420 alone is intractable.

Figure 6:
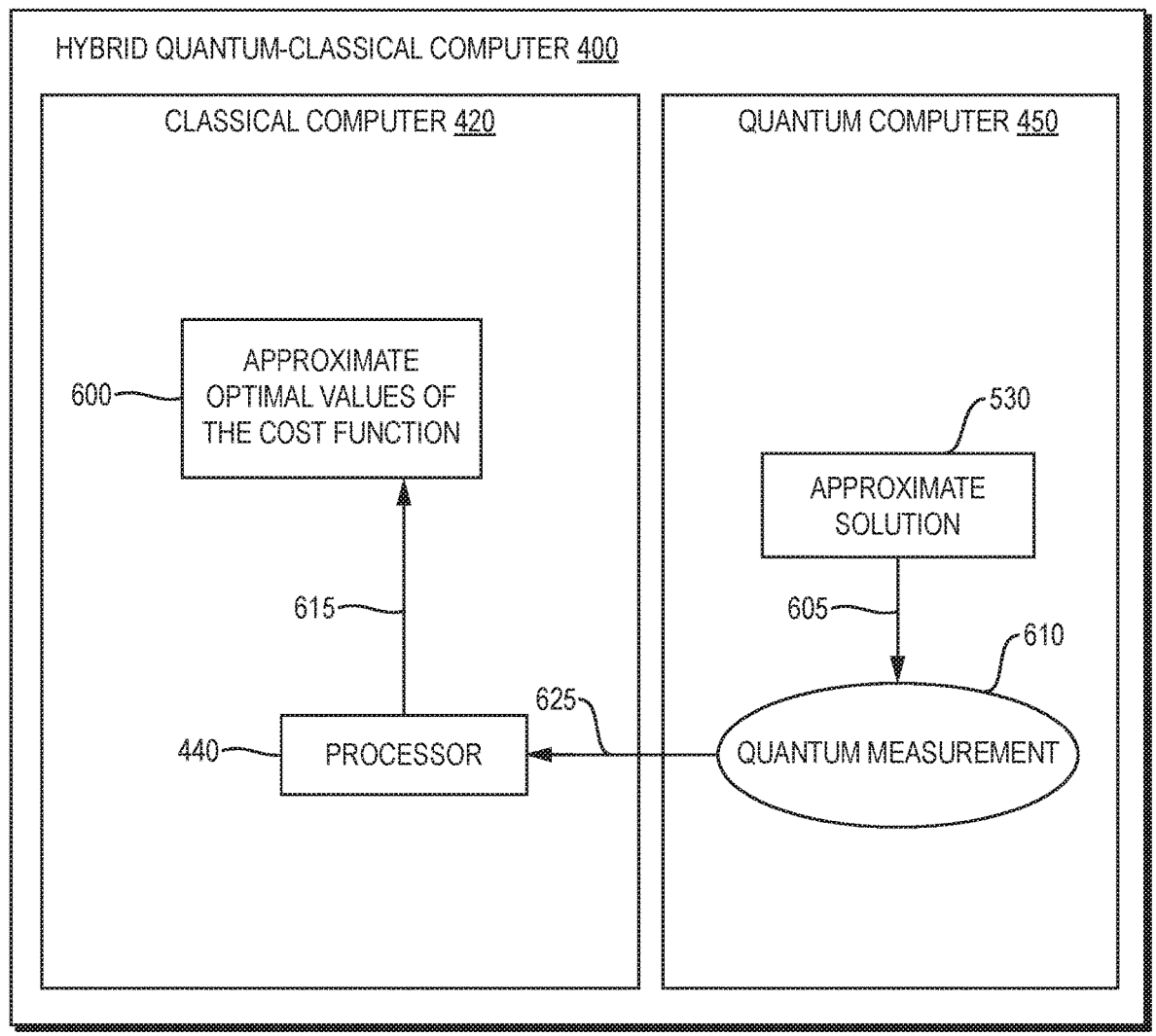

FIG. 6 illustrates an embodiment in which the approximate solution 530 of the optimization problem 432 is measured 605 by the quantum measurement 610 on the quantum computer 450. The result of the quantum measurement 610 represents at least one attribute or a combination of attributes of the approximate solution and of the cost function for the optimization problem. The result of the quantum measurement 610 on the quantum computer 450 is transferred 625 to the processor 440 on the classical computer 420. The processor 440 on the classical computer 420 then determines 615 approximate optimal values 600 of a cost function of the optimization problem 432 by evaluating the cost function with respect to the approximate solution 530 on the quantum computer.

The quantum measurement 610 of the cost function on the quantum computer 450 is advantageous compared to the prior art evaluation of the cost function on a classical computer 420 because computational resources on the classical computer 420 required for evaluating the cost function may not be realistic; for example, the memory 430 on the classical computer 420 may not be sufficient to store the approximate solution 530. In other embodiments, the quantum measurements 610 are performed on the quantum computer 450 and the approximate optimal values 600 of the cost function is determined 625 from the outcome of the quantum measurements 610 on the processor 440 of the classical computer 420. In one embodiment, the processor 440 on the classical computer 420 calculates statistics of the quantum measurements.

Figure 7:
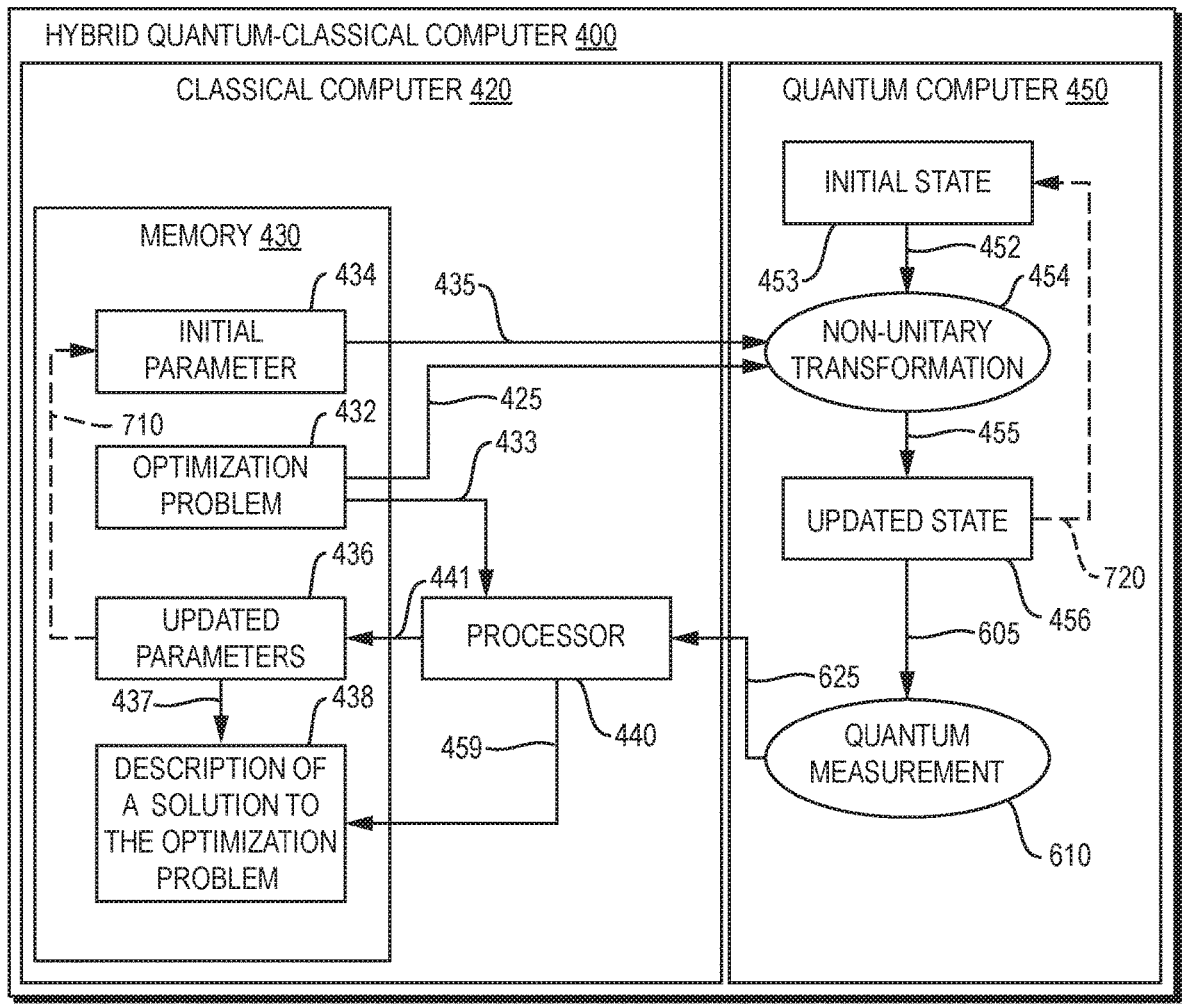

FIG. 7 illustrates one embodiment wherein the approximate solution 530 to the optimization problem 432 and the quantum states 452/456 are improved with the iterative loop 610/620 on the classical/quantum computer 420/450. The iterative loop 720 on the quantum computer 450 begins by applying 453 the quantum non-unitary transformation 454 to the initial state 452 to produce 455 the updated state 456 on the quantum computer 450. The iterative loop 710 on the classical computer 420 then determines 441, on the processor 440 of the classical computer 420, the updated parameters 436 from the updated state 456 using the outcomes of the quantum measurements 610 on the quantum computer 450 and the optimization problem 432 stored in the memory 430 of the classical computer 420. Finally, the updated parameters 436 substitute 710 on the classical computer 420 the initial parameters 434 and are transmitted 435 from the memory 430 of the classical computer 420 to the quantum computer 450 to determine 435 the non-unitary transformation 154 on the quantum computer 450. At the same time, the updated state 456 substitutes 720 the initial state 452 on the quantum computer 450. Then the loop 710/720 repeats itself iteratively.

Figure 8A:
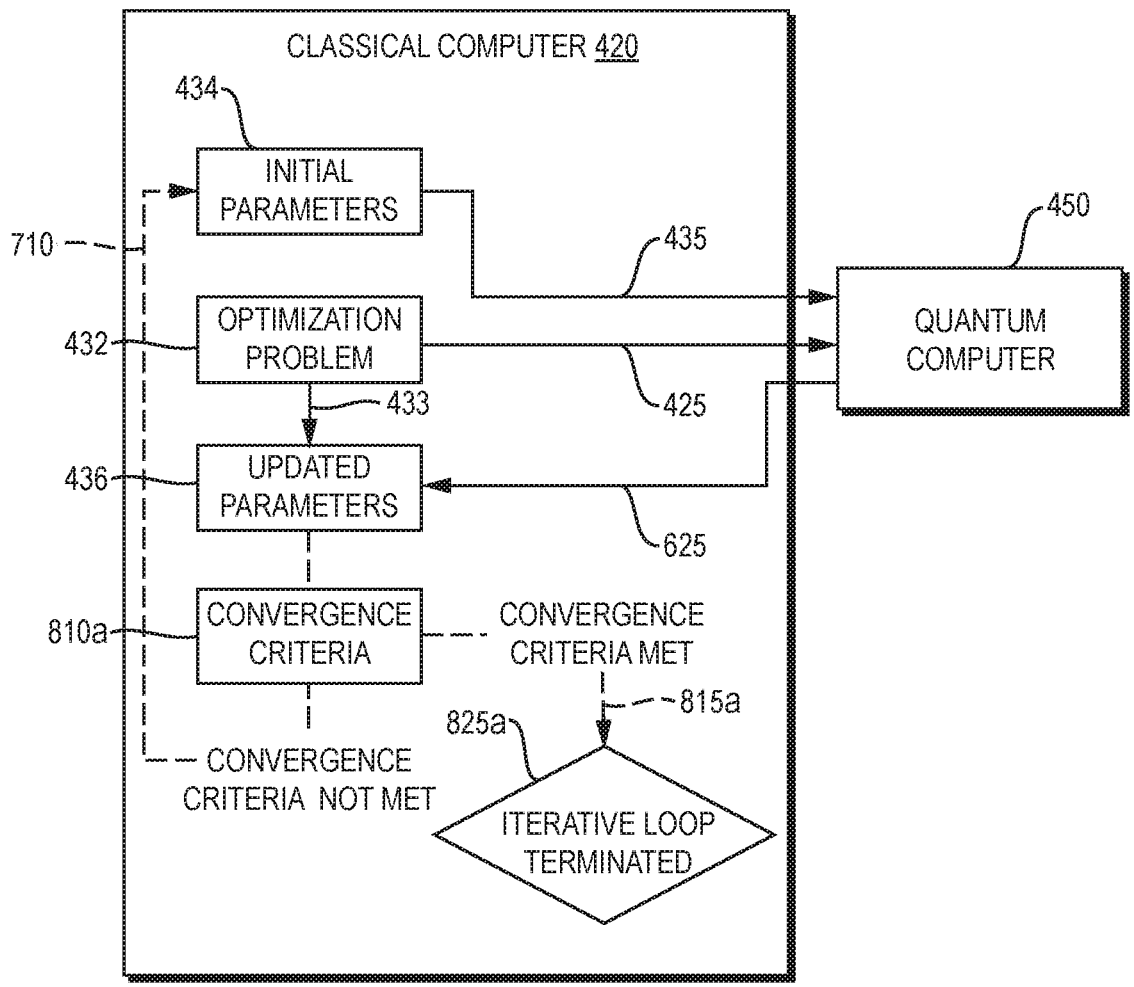
Figure 8B:
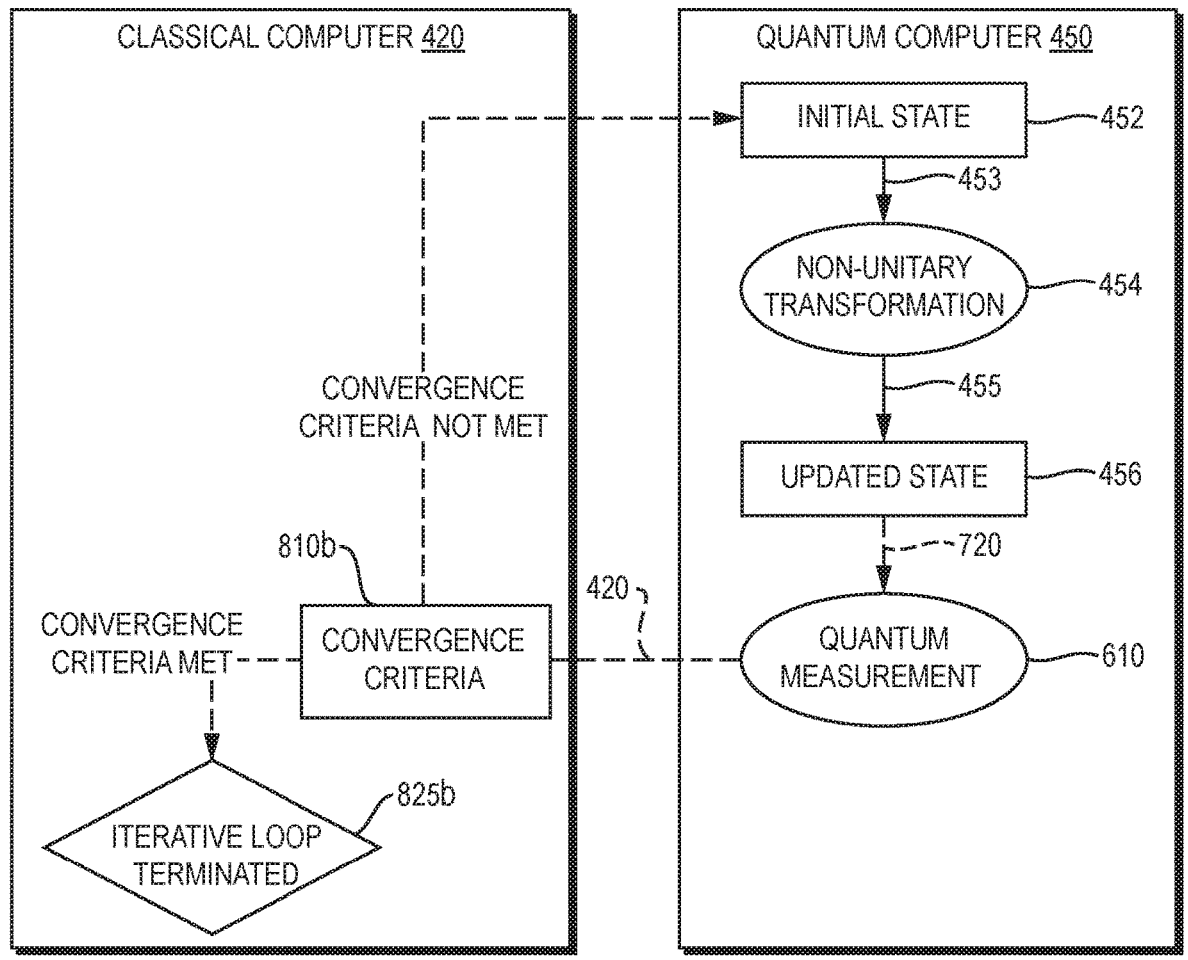

FIG. 8a and FIG. 8b illustrate embodiments wherein the iterative loop 710/720 includes checking convergence criteria 810a/810b, wherein the repetitive execution of the iterative loop 710/720 is terminated 825a/825b if the convergence criteria 810a/810b are met 815a/815b. FIG. 8a illustrates one embodiment wherein the convergence criteria 810a are determined by iterative increments in the cost function or the profit function.

FIG. 8b illustrates another embodiment wherein the convergence criteria 810b are determined by the distance between two subsequent states 452 or 456 in the iterative loop 720, describing how well two subsequent states 452 or 456 in the iterative loop 720 approximate each other. In this embodiment, the iterative loop 720 includes checking convergence criteria 810b and substituting the initial state 452 with the updated state 456 if the convergence criteria 810b are not met.

In one embodiment, the distance between two quantum states is determined by a quantum measurement device 610. In another embodiment, the quantum measurement device performs a Swap Test between two input quantum states. The Swap Test is a well-known quantum algorithm for evaluating the overlap between two quantum states efficiently on a quantum computer.

Figure 9A:
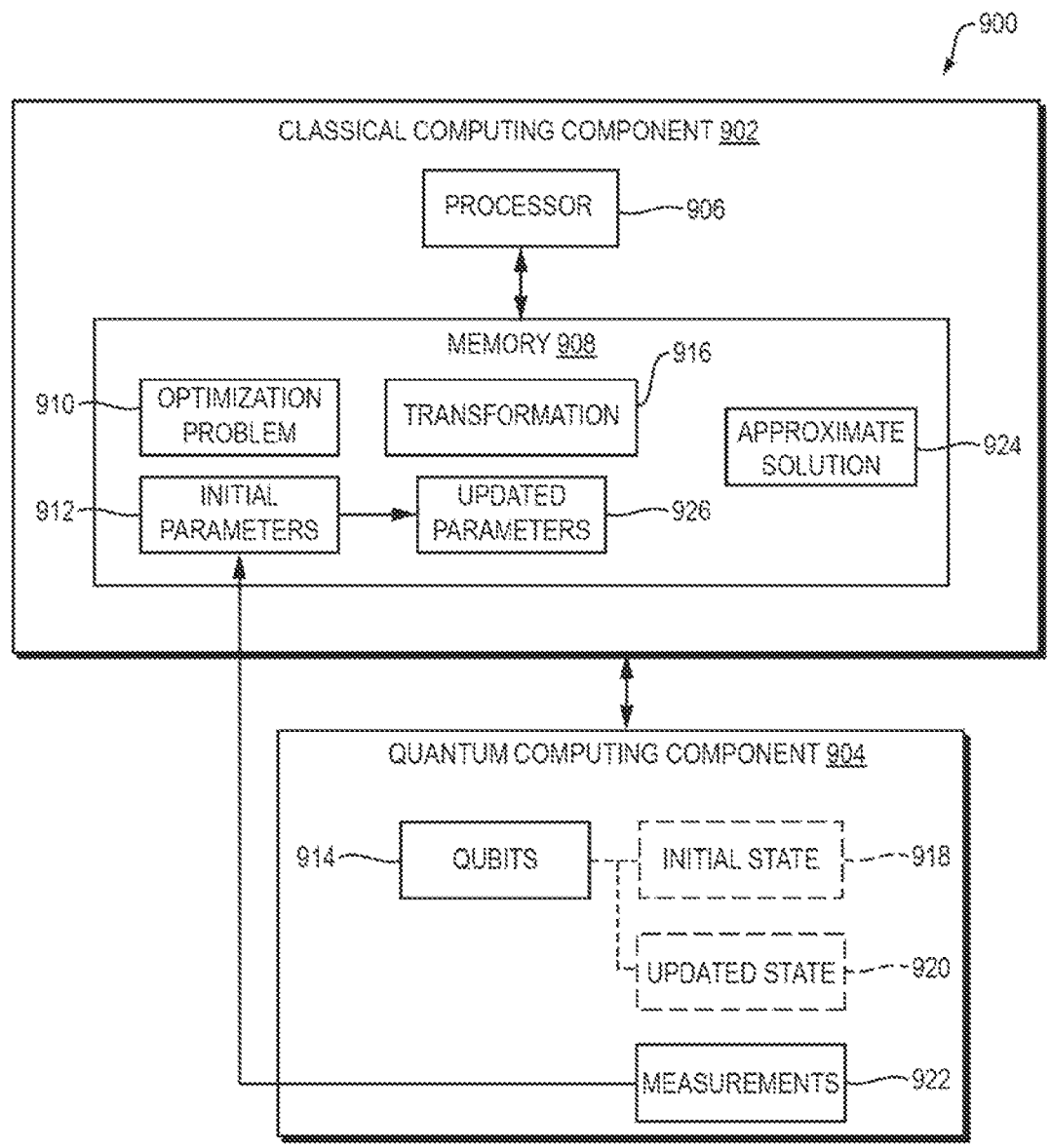
FIG. 9A is a dataflow diagram of a hybrid quantum-classical computer for solving an optimization problem according to one embodiment of the present invention.
Figure 9B:
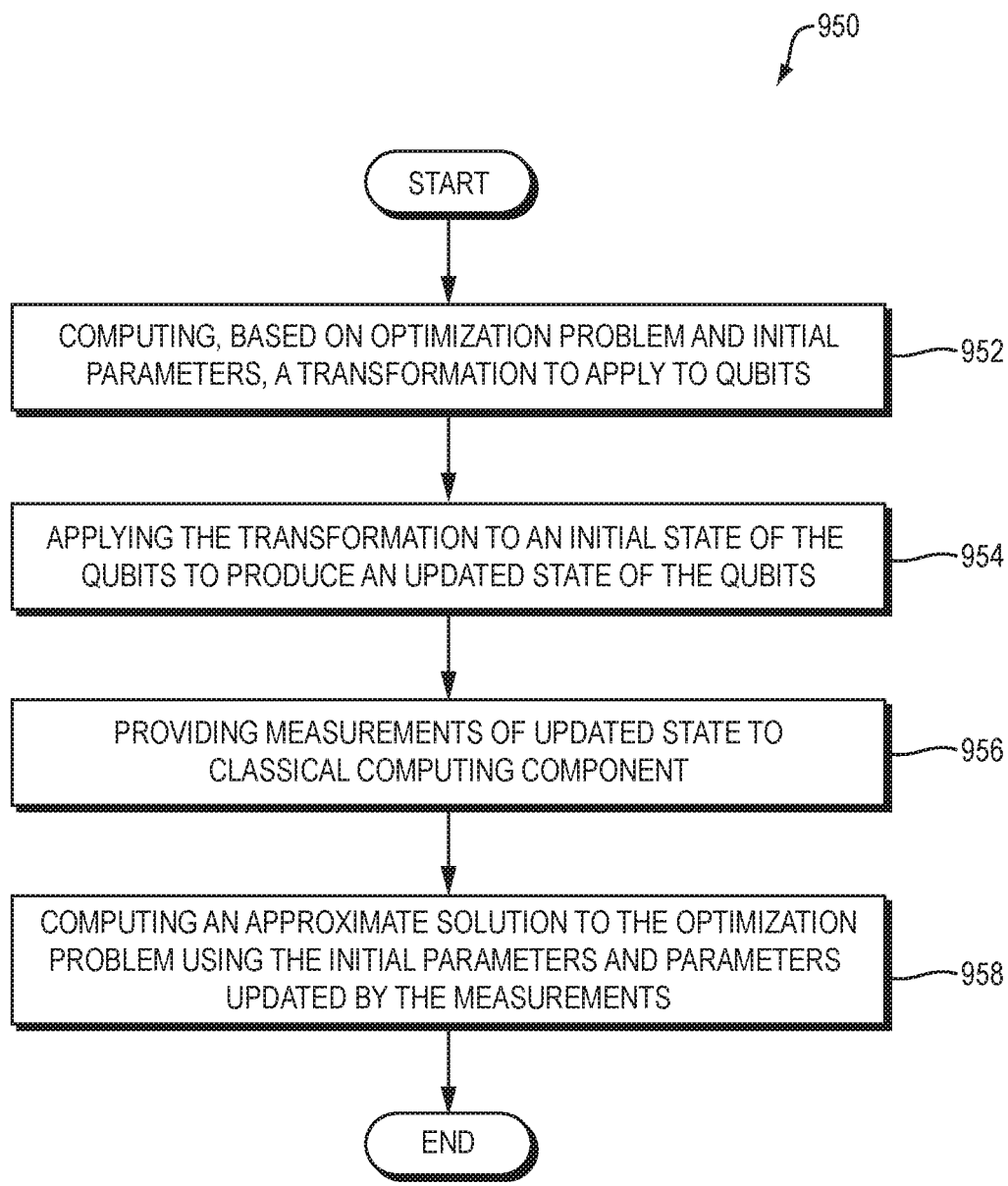
FIG. 9B is a flowchart of a method performed by the computer of FIG. 9A according to one embodiment of the present invention.

Referring to FIG. 9A, a dataflow diagram is shown of a hybrid quantum-classical computer 900 for solving an optimization problem. The hybrid quantum-classical computer 900 may, for example, be any of the kinds of hybrid quantum-classical computers disclosed herein. The hybrid quantum-classical computer 900 may include a classical computing component 902 and a quantum computing component 904. The classical computing component 902 may include a processor 906 and a non-transitory computer-readable memory 908, which may include data 910 representing an optimization problem. Referring to FIG. 9B, a flowchart is shown of a method 950 performed by the hybrid quantum-classical computer 900 of FIG. 9A according to one embodiment of the present invention.

The method 950 includes computing, by the classical computing component 902, based on the optimization problem 910 and initial parameters 912 stored in the memory 908 of the classical computing component 902, a transformation 916 to apply to a plurality of qubits 914 in the quantum computing component 904 (FIG. 9B, operation 952). The classical computing component 902 may store the transformation 916 in the memory 908. The method 950 also includes applying, by the quantum computing component 904, the transformation 916 to an initial state 918 of the plurality of qubits 914 to produce an updated state 920 of the qubits 914 (FIG. 9B, operation 954).

The method 950 also includes providing, by the quantum computing component 904, to the classical computing component 902, measurements 922 of the updated state 920 (FIG. 9B, operation 956). The method 950 also includes computing, by the classical computing component 902, an approximate solution 924 to the optimization problem 910 using the initial parameters 912 and parameters 926 updated by the measurements 922 of the updated state 920 (FIG. 9B, operation 958). The method 950 may include generating the updated parameters 926 based on the measurements 922.

The transformation 916 may, for example, be a unitary transformation or a non-unitary transformation. Computing the transformation 916 (FIG. 9B, operation 952) may include applying a formula to the initial parameters 912 and a cost function (not shown) of the optimization problem.

The method 950 may further include, before providing the measurements 922 of the updated state 920 (FIG. 9B, operation 956), measuring the updated state 920 to obtain the measurements 922 of the updated state 920.

Computing the approximate solution 924 to the optimization problem 910 (FIG. 9B, operation 958) may include, for example: (1) computing, by the classical computing component 902, a first approximate solution to the optimization problem 910; (2) computing, by the classical computing component 902, an output of a cost function of the first approximate solution; (3) after computing the first approximate solution to the optimization problem 910, computing, by the classical computing component, a second approximate solution to the optimization problem 910; (4) computing, by the classical computing component 902, an output of the cost function of the second approximate solution; (5) computing, by the classical computing component 902, a difference between the first and second outputs of the cost function; (6) if the difference between the first and second outputs of the cost function is greater than a minimum threshold value, then repeating (1)-(5); and (6) if the difference between the first and second outputs of the cost function is not greater than the minimum threshold value, then outputting the second approximate solution as the approximate solution to the optimization problem.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to a d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a 2n×2n complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled E). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
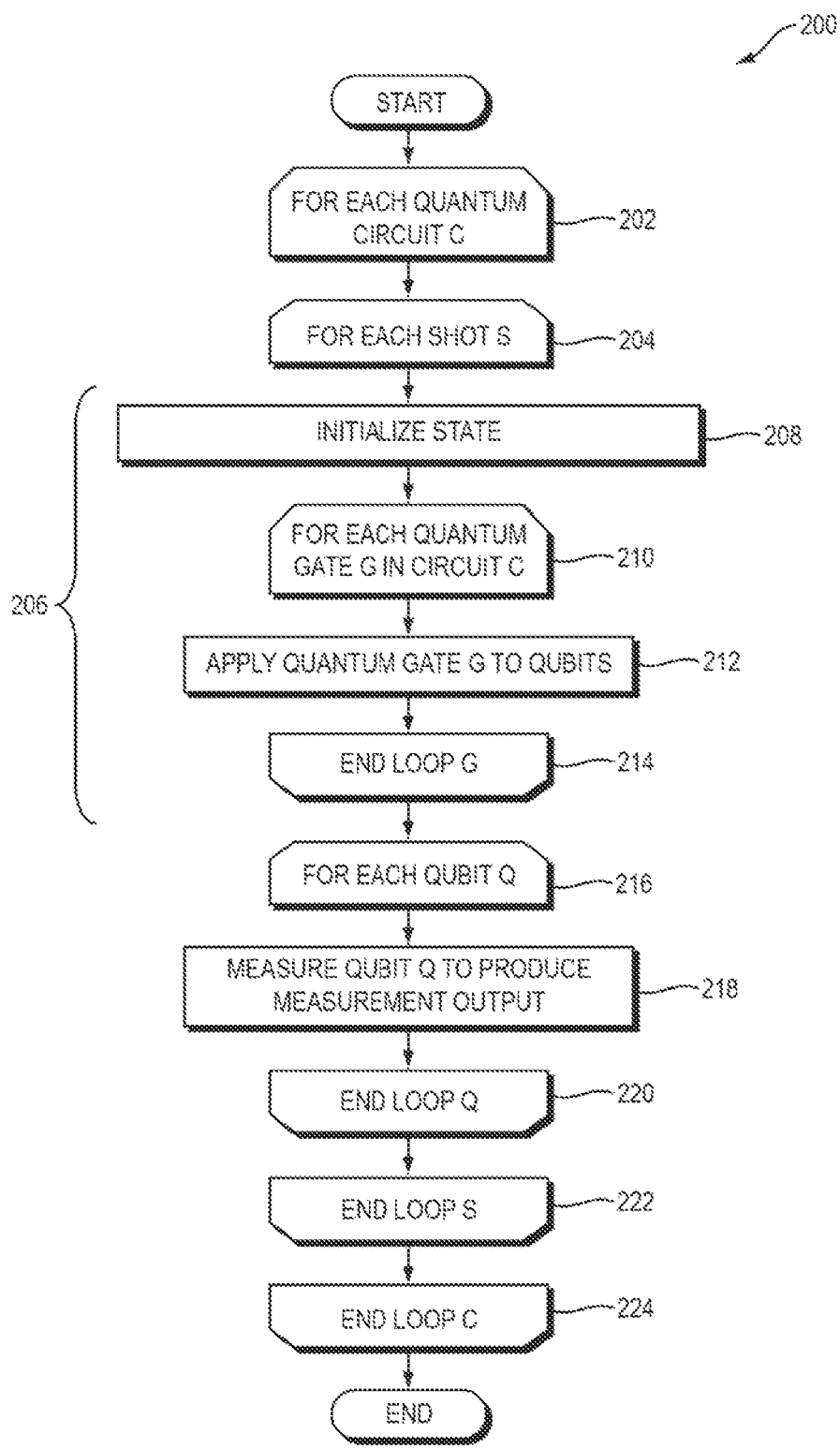
FIG. 2A is a flowchart of a method performed by the quantum computer of FIG. 1 according to one embodiment of the present invention.
Figure 2B:
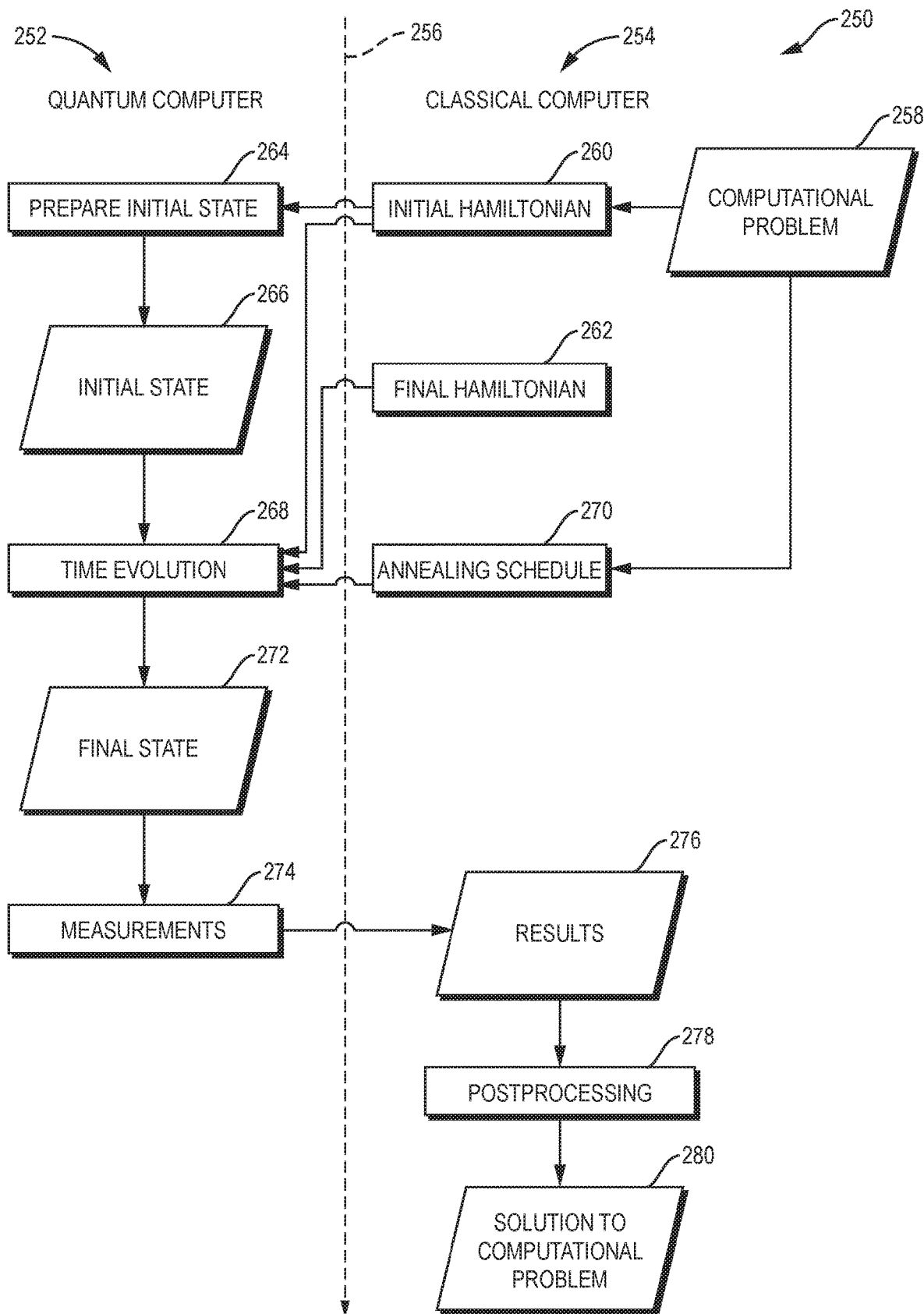
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original optimization problem 258. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:
In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signal 114 from the measurement unit 110 to the control unit 106. Such feedback signal 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e., the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A-2B as elements of "state preparation" may instead be characterized as elements of gate application. Conversely, for example, some or all of the components and operations that are illustrated in FIGS. 1 and 2A-2B as elements of "gate application" may instead be characterized as elements of state preparation. As one particular example, the system and method of FIGS. 1 and 2A-2B may be characterized as solely performing state preparation followed by measurement, without any gate application, where the elements that are described herein as being part of gate application are instead considered to be part of state preparation. Conversely, for example, the system and method of FIGS. 1 and 2A-2B may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times.

For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
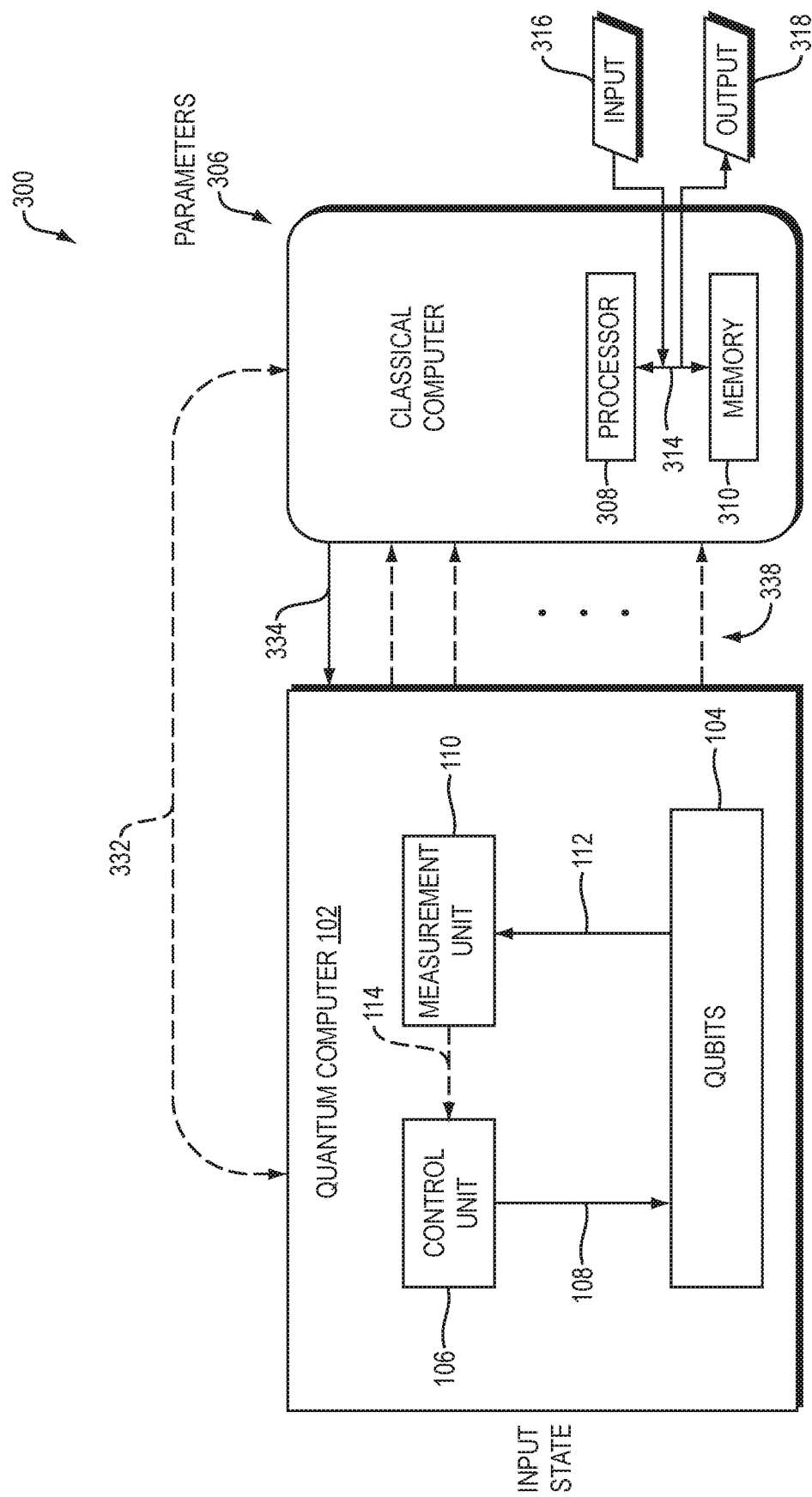
FIG. 3 is a diagram of a hybrid quantum-classical computer according to one embodiment of the present invention.

Referring to FIG. 3, a diagram is shown of a hybrid quantum-classical (HQC) computer 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals Y32 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals Y34 to the quantum computer 102, in response to which the quantum computer 102 may apply the gate operations specified by the control signals Y32 to the qubits 104, as a result of which the qubits 104 arrive at a final state. The measurement unit 110 in the quantum computer 102 (which may be implemented as described above in connection with FIGS. 1 and 2A-2B) may measure the states of the qubits 104 and produce measurement output Y38 representing the collapse of the states of the qubits 104 into one of their eigenstates. As a result, the measurement output Y38 includes or consists of bits and therefore represents a classical state. The quantum computer 102 provides the measurement output Y38 to the classical processor 308. The classical processor 308 may store data representing the measurement output Y38 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum-classical (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, the methods and systems described herein provide functionality for creating a loop between a quantum computing component and a classical computing component whereby measurements of qubits in the quantum computing component are used in modifying data stored by the classical computing component and the execution of the classical computing component itself.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

What is claimed is:

1. A method for solving, by a hybrid quantum-classical computer comprising a classical computing component and a quantum computing component, an optimization problem stored in a non-transitory computer-readable memory of the classical computing component of the hybrid quantum-classical computer, the method comprising:
    computing, by the classical computing component, based on the optimization problem and initial parameters stored in the memory of the classical computing component, a non-unitary transformation to apply to a plurality of qubits in the quantum computing component;
    applying, by the quantum computing component, the non-unitary transformation to an initial state of the plurality of qubits to produce an updated state;
    providing, by the quantum computing component, to the classical computing component, measurements of the updated state;
    computing, by the classical computing component, an approximate solution to the optimization problem using the initial parameters and parameters updated by the measurements of the updated state.

2. The method of claim 1, wherein computing the non-unitary transformation comprises applying a formula to the initial parameters and a cost function of the optimization problem.

3. The method of claim 1, further comprising, before providing the measurements of the updated state, measuring the updated state to obtain the measurements of the updated state.

4. The method of claim 1, wherein computing the approximate solution to the optimization problem comprises:
(1) computing, by the classical computing component, a first approximate solution to the optimization problem;
(2) computing, by the classical computing component, an output of a cost function of the first approximate solution;
(3) after computing the first approximate solution to the optimization problem, computing, by the classical computing component, a second approximate solution to the optimization problem;
(4) computing, by the classical computing component, an output of the cost function of the second approximate solution;
(5) computing, by the classical computing component, a difference between the first and second outputs of the cost function;
(6) if the difference between the first and second outputs of the cost function is greater than a minimum threshold value, then repeating (1)-(5);
(7) if the difference between the first and second outputs of the cost function is not greater than the minimum threshold value, then outputting the second approximate solution as the approximate solution to the optimization problem.

5. A hybrid quantum-classical computer for solving an optimization problem, the hybrid quantum-classical computer comprising:
a classical computing component comprising at least one processor and a non-transitory computer-readable memory, the non-transitory computer-readable memory comprising data representing the optimization problem; and
a quantum computing component comprising a plurality of qubits;
wherein the non-transitory computer-readable memory of the classical computing component further comprises computer program instructions executable by the at least one processor to:
compute, based on the optimization problem and initial parameters stored in the memory of the classical computing component, a non-unitary transformation to apply to a plurality of qubits in the quantum computing component;
provide a signal to the quantum computing component to apply the non-unitary transformation to an initial state of the plurality of qubits;
wherein the quantum computing component is adapted to:
apply the non-unitary transformation to the initial state of the plurality of qubits in response to receiving the signal; and
provide, to the classical computing component, measurements of the updated state; and
wherein the computer program instructions further comprises computer program instructions which, when executed by the at least one processor, cause the classical computing component to compute an approximate solution to the optimization problem using the initial parameters and parameters updated by the measurements of the updated state.

6. The hybrid quantum-classical computer of claim 5, wherein computing the non-unitary transformation comprises applying a formula to the initial parameters and a cost function of the optimization problem.

7. The hybrid quantum-classical computer of claim 5, wherein the computer program instructions further comprise computer program instructions which, when executed by the at least one processor, cause the classical computing component to measure the updated state to obtain the measurements of the updated state before providing the measurements of the updated state.

8. The hybrid quantum-classical computer of claim 5, wherein computing the approximate solution to the optimization problem comprises:
(1) computing, by the classical computing component, a first approximate solution to the optimization problem;
(2) computing, by the classical computing component, an output of a cost function of the first approximate solution;
(3) after computing the first approximate solution to the optimization problem, computing, by the classical computing component, a second approximate solution to the optimization problem;
(4) computing, by the classical computing component, an output of the cost function of the second approximate solution;
(5) computing, by the classical computing component, a difference between the first and second outputs of the cost function;
(6) if the difference between the first and second outputs of the cost function is greater than a minimum threshold value, then repeating (1)-(5);
(7) if the difference between the first and second outputs of the cost function is not greater than the minimum threshold value, then outputting the second approximate solution as the approximate solution to the optimization problem.

* * * * *